US00RE35529E

United States Patent [19]

Michlin

[11] E Patent Number: Re. 35,529

[45] Reissued Date of Patent: Jun. 10, 1997

[54] COPIER AND PRINTER TONER HOPPER SEALING DEVICE

[76] Inventor: Steven B. Michlin, 5310 Bentley, #105, West Bloomfield, Mich. 48322

[21] Appl. No.: 560,475

[22] Filed: Nov. 17, 1995

Related U.S. Patent Documents

Reissue of:

[64] Patent No.: 5,282,003
Issued: Jan. 25, 1994
Appl. No.: 4,253
Filed: Jan. 14, 1993

[51] Int. Cl.[6] ..... G03G 15/06; G03G 21/00

[52] U.S. Cl. ..... 399/106; 141/363; 141/364; 222/DIG. 1

[58] Field of Search ..... 355/245, 260, 355/200; 222/DIG. 1, 325, 561; 229/125.12; 141/363, 364; 285/229, 236, 423

[56] References Cited

U.S. PATENT DOCUMENTS

| | | | |
|---|---|---|---|
| 4,325,572 | 4/1982 | Arntyr et al. | 285/229 |
| 4,615,608 | 10/1986 | Mizutani | 222/DIG. 1 X |
| 4,732,277 | 3/1988 | Smith | 222/DIG. 1 X |
| 4,778,086 | 10/1988 | Shibata et al. | 222/DIG. 1 X |
| 4,816,877 | 3/1989 | Keen | 222/DIG. 1 X |
| 4,827,307 | 5/1989 | Zoltner | 355/260 X |
| 4,862,210 | 8/1989 | Woolley | 355/245 |
| 4,930,684 | 6/1990 | Patterson | 222/DIG. 1 X |
| 4,931,838 | 6/1990 | Ban et al. | 355/260 |
| 4,942,432 | 7/1990 | Mort et al. | 355/260 |
| 4,981,218 | 1/1991 | Ban et al. | 355/260 X |
| 5,110,646 | 5/1992 | Prestel et al. | 355/260 X |
| 5,142,335 | 8/1992 | Sakata et al. | 355/260 |
| 5,150,807 | 9/1992 | Seyfried et al. | 355/260 X |
| 5,184,182 | 2/1993 | Michlin | 355/260 |
| 5,229,824 | 7/1993 | Tsusaka et al. | 355/260 |
| 5,258,814 | 11/1993 | Davies | 355/260 |
| 5,296,902 | 3/1994 | Michlin | 355/260 |

*Primary Examiner*—Arthur T. Grimley
*Assistant Examiner*—Shuk Yin Lee

[57] ABSTRACT

A toner hopper seal-insert and slide-seal to provide for the shipping and transporting of a refilled toner cartridge. The seal-insert is comprised of two slotted rectangular strips or pieces of material. A middle piece or layer of a resilient two-sided foam tape is sandwiched between the two slotted pieces, holding them together such that their slots align. The tape is configured such that it also has a slot which is wider than the slots in the two outer pieces and open at one end, providing a channel for the slide-seal. The seal-insert is attached to the toner hopper of the toner cartridge, and the slide-seal is slid into or out of position in the seal-insert to seal or unseal the opening of the toner hopper, creating a reusable leakproof seal system. For ease of placing the seal-insert in the toner hopper, the ends of the outer pieces opposite the slot openings in the tape layer may be bent and fused together, then cut into a shape extending to a point. The slide-seal may be a magnetized flexible strip so it attracts toner and further improves the seal. It may also be provided with a handle for ease of operation. For toner hoppers with wider openings, the width of the seal-insert is increased but the slots remain the same size. The increased width of the seal-insert is furnished with a removable tool to keep the seal-insert rigid as it is placed into position on the toner hopper.

81 Claims, 10 Drawing Sheets

COPIER AND PRINTER TONER HOPPER SEALING DEVICE

Matter enclosed in heavy brackets [ ] appears in the original patent but forms no part of this reissue specification; matter printed in italics indicates the additions made by reissue.

BACKGROUND OF THE INVENTION

This invention relates to an apparatus for providing means for re-sealing a toner hopper, which is a part of an expensive toner cartridge, used on a dry toner printer, copying machine, or facsimile machine in order that the hopper, filled with dry toner, can be shipped from one location to another, without spillage of the dry toner powder which behaves similar to a liquid.

It is customary for the manufacturer of a printer or copying machine, using dry toner, to fill the toner hopper with dry toner, and seal the top of the toner hopper with a plastic sheet, attached, and sealed on the sides of the hopper, and on each end of the hopper, just prior to assembling the toner hopper with the other components of a toner cartridge unit. When the toner cartridge is received at the using location, the seal is removed from the toner hopper section of the cartridge, and the printer or copier is ready for use, with the toner exposed to the roller feed device for making copies.

Recent developments in the dry toner imaging industry have lead to the use of "throw-away" type toner cartridges, whereby the user of the copier or printer must buy a new, filled, toner cartridge from the manufacturer, when the original toner hopper in the toner cartridge is depleted of toner. This method of throw-away toner cartridges is very expensive to the user of the copier or printer as a new cartridge is required each time the toner in the toner cartridge's toner hopper is depleted. The toner is expensive enough, but to add the expense of a new cartridge, with its toner dispensing means, adds a substantial amount of cost to the replacement procedure.

It has been customary in the past to throw away these very expensive, empty toner cartridges, and replace them with new, filled, and sealed factory toner cartridges. The manufacturers seal the toner hopper components in these new toner cartridges at their manufacturing location, and there is no leakage of the toner during shipment. This type of operation, using expensive throw-away cartridges, has therefore, led to the need for a method and apparatus for re-filling, re-sealing, shipping, and re-using these toner cartridges, with the obvious savings of the cost of the new toner cartridge, in addition to the benefits of avoiding disposal and environmental problems.

No prior art is available for comparison to this invention, although the inventor is aware of several products, which have tried to solve the problem and several references are cited, which tend to outline the problem of dry toner use in these dry toner printers and copiers, and, it is obvious to a prior user of these printers and copiers that any leakage of this dry toner from the toner cartridge unit is a major cleaning problem at best, and may cause severe soiling damage to the surrounding environment, in the normal accident, as well as damage to the equipment.

One such product for re-sealing the dry toner hopper when refilling uses a plastic sheet, which slides into the slot in the toner hopper section of the toner cartridge, created when the original seal is removed.

Another product for re-sealing the dry toner in the re-filled hopper uses a plastic sheet with a magnetic coating, to try to keep the dry toner from spilling during shipment to the user. Still others try to duplicate the factory method which may require disassembly and modification of the toner hopper and thorough cleaning of the seal-grooves.

Most of the prior products, designed for this purpose of sealing the dry toner hopper for shipment, have a major problem in their design. This problem centers around the long slots along the longitudinal sides of the dry toner hopper. These slots are not sealed along this longitudinal axis, after the original seal is removed, and have irregular openings along their longitudinal axis. Now, the prior products, being of a fixed thickness, slide into the uneven slot, to fill parts of the distance of the slot, leaving minute openings along the longitudinal axis of the toner hopper, with the resulting leakage of the dry toner during shipment, causing major problems to the shipper and the receiver of the re-filled dry toner hoppers.

Another problem involves some toner hoppers that have a very narrow slot constriction that the toner seal, wider than the slot, must pull through. It is very cumbersome to seal such a toner hopper with a narrow slot constriction because the seal's width must pull through the constriction.

Another problem involves seal re-usability. Of the prior art, those seal systems that are re-usable tend to leak. However, those that do not leak are not re-usable.

Those seal systems that use a form of sticky back tape alone as the seal, have four general problems. First, these seals may tear. Second, they may stick to toner in the slot causing them to unstick therefore, not forming a perfect seal. Prevention of this unsticking requires an excessive mount of extra labor in cleaning toner from the seal-grooves. Third, these seal systems do not consistently seal well. A fourth problem involves foam-tearing. Many such seals that are leakproof tear the sealing foam in the hopper, if not from pulling the seal, whereby the sticky tape tears the foam, then the sealing foam tears from use of the common metallic insertion tool on each usage cycle. Once this foam partially tears out, the hopper will then leak, causing the problem the seal was supposed to prevent.

Another problem with prior art is that those seals that are leakproof tend to take a long time to insert, unlike a slide-seal. Those contemporary seals that are slide-seals, of prior art, tend to leak.

An invention was disclosed to solve these problems in application Ser. No. 845,722, filed Mar. 4, 1992 by this applicant. Three thin, flat, plastic or steel rectangles were made to form a seal-insert. Two were identical rectangles with a longitudinal centerline slot cut out for the purpose of allowing toner to fall through. These two rectangles sandwiched the third rectangle between them. The third rectangle had a similar slot but which was open at one end. These three rectangles were pressed firmly together and sealed together to form a one-piece seal-insert unit with an open longitudinal centerline slot. The middle rectangle's open-ended slot allowed a slide-seal to be inserted and removed. The seal-insert was intended for permanent insertion into a toner hopper. When the slide-seal, consisting of a stiff strip, slid into the slot of the middle rectangle, a seal was achieved so that toner powder could not leak out and the toner hopper could be shipped from one location to another.

The present invention is a further improvement on that disclosed seal-insert and slide-seal.

SUMMARY OF THE INVENTION

Accordingly, it is an object of this invention to provide a new and improved apparatus and method for re-sealing re-filled dry toner hoppers, which are usually components of toner cartridges, in a manner to allow for the shipping of these re-filled dry toner cartridges from one location to another, without spillage of the dry toner from the re-filled dry toner hopper, using a permanent seal-insert which acts as a holder for the slide-seal.

Another object of this invention is to provide a reuable sealing apparatus which is very quick and easy to insert into the slot. A grooved seal-insert is permanently affixed to the toner hopper which then allows a slide-seal to slide in and out of the seal-insert.

In carrying out this invention in the illustrative embodiment thereof, a seal-insert is created. Two thin, flat, plastic or steel rectangular pieces are joined together by a foam-type two-sided tape. The two pieces have longitudinal centerline dots which are aligned when the pieces are joined together. The tape is sandwiched between the two pieces and is arranged in a configuration such that a slot is formed which is wider and longer than the slots in the two outer pieces and is open at one end. This provides a one-piece seal-insert unit. The seal-insert is intended for permanent insertion into a toner-hopper. When the slide-seal, consisting of a stiff strip, slides into the slot formed by the tape, a perfect seal is achieved so that no toner powder will leak out and the toner hopper may be shipped from one location to another.

When the slide-seal is pulled out of its slot, toner may fall through the slot into the top portion of the toner hopper. After toner is completely expended from the toner hopper, when the toner hopper is re-used, the slide-seal may quickly and easily be inserted in the groove of the permanent seal-insert again and again, many times.

The purpose of installing the permanent slotted seal-insert is to modify the hopper so as to to allow a quick to install, reusable slide-seal to seal the unit.

By use of the foam-type two-sided tape, and because the outer pieces are very thin plastic or metal, the seal becomes compressible and expandable. When the seal-insert is placed in the hopper grooves, it will expand or compress to seal the hopper-grooves, even with an uneven surface of the grooves and clumps of toner stuck in the grooves, providing an improved seal. The flexibility makes it easier to place the seal-insert in the grooves. Additionally, by using the foam-type two-sided tape, the assembly of the seal-insert itself is simplified, eliminating the need for caulks, glues, or dissolving chemicals to fuse the pieces together. It is also inexpensive.

Copending application Ser. No. 07/850,930 filed Mar. 13, 1992, discloses another reusable seal, but it does not have a slot for a removable slide-seal.

BRIEF DESCRIPTION OF THE DRAWINGS

This invention, together with other objects, features, aspects, and advantages thereof, will be more clearly understood from the following description, considered in conjunction with the accompanying drawings.

COMPLETE DESCRIPTION OF THE PREFERRED EMBODIMENT

Figure 1:
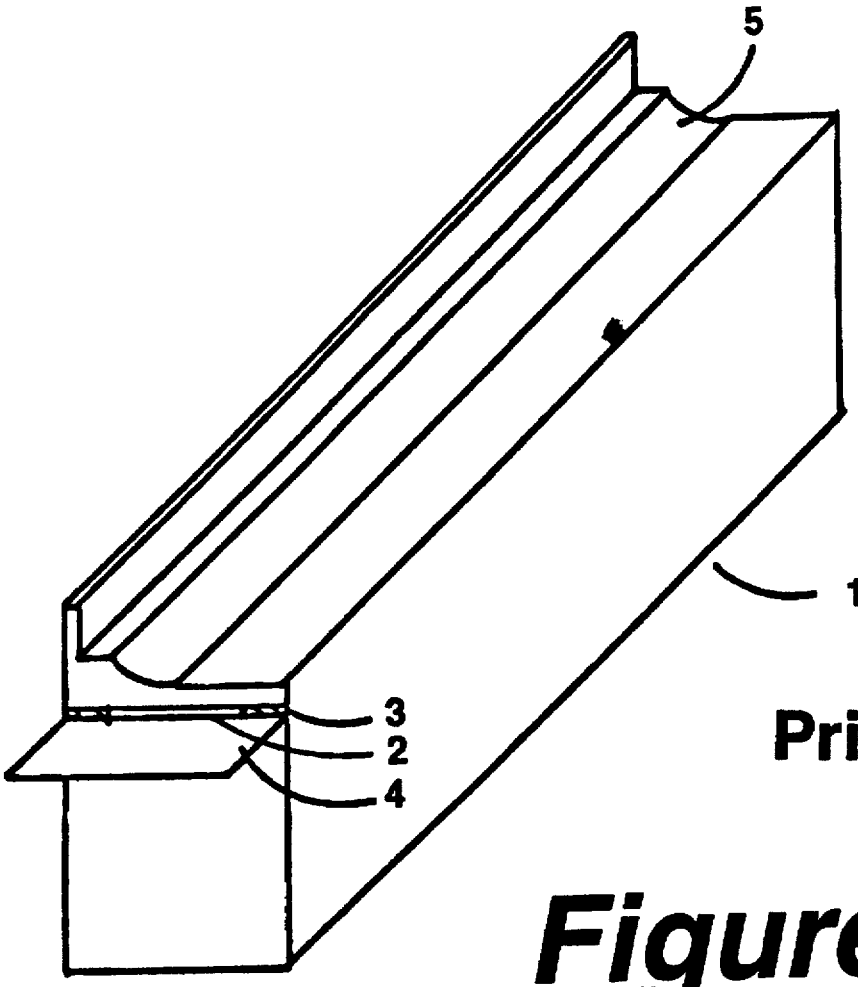
Prior Art Figure 1
FIG. 1 is an isometric view of a conventional dry toner hopper with hopper grooves, showing the opening where toner falls through in the toner hopper.

Referring now to FIG. 1, a re-usable dry toner hopper, referred to generally by the reference numeral 1, is to be filled with a new supply of dry toner and sealed, thus eliminating the need to discard the expensive toner cartridge that it came from and replace it with a new one. Still referring to FIG. 1, we see a provision for a feed roller, referred to as the numeral 5, adjacent to the open passage of the toner hopper and used to dispense the supply of dry toner. Now, it can be seen that if this dry toner hopper was rotated from this upright position, the dry toner would spill from the toner hopper.

Still referring to FIG. 1, we see opening 2, the opening being created when the original factory seal was removed from the toner hopper 1. It extends across the entire hopper. An attach bracket 4 is provided for holding the original seal tab in place before removal of the original factory seal, for initial operation of the toner cartridge. FIG. 1 also shows a toner hopper sealing material 3, installed at the original factory, not unlike foam, sometimes used in the hopper along the seal perimeter to prevent leakage. It can be seen that means is needed to seal the toner hopper 1 to be re filled with new dry toner, installed in a toner cartridge, and transported to its destination. Toner hoppers similar to that in FIG. 1 have hopper-grooves along the outer perimeter. Along these hopper grooves that go the length of the hopper across both sides, and across the width at both ends, where toner may leak. So, these hopper-grooves must be completely and tightly sealed for any sealing system to properly function. Because of the hopper-grooves, a device is "slid" into this type of hopper.

Figure 2:
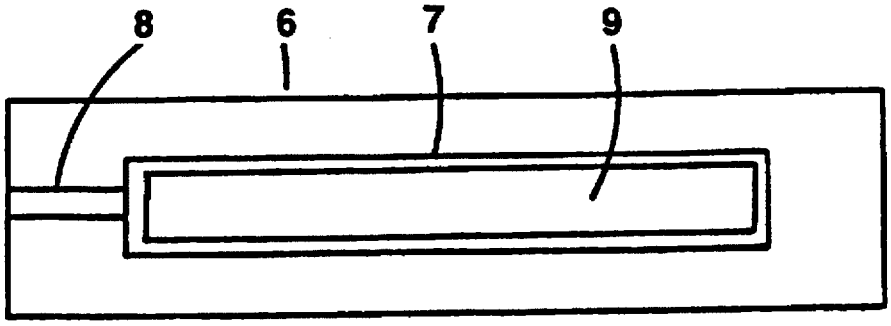
Prior Art Figure 2
FIG. 2 is a top view of another variety of conventional toner hopper without hopper-grooves showing the area toner falls through, the narrow constriction in the toner hopper, and the typical attach-area available to attach the seal-insert.

Now, referring to FIG. 2, another toner hopper 6 is shown of a slightly different style without outer perimeter hopper grooves. Because this hopper has no hopper-grooves, a device my be "placed over" the toner hopper's storage cavity. The original seal-attach-area perimeter 7 is shown so that a seal overlapping this will also cover the opening 9 where dry toner will fall through if the hopper is turned upside down. The width of any pull-seal is limited by the width of the narrow constriction 8 grooved in the toner hopper 6.

It is this constriction 8 in the toner hopper 6 that requires the use of two components to seal the hopper 6. The two components consist of the seal-insert 10, shown in FIG. 3, and the slide-seal 17 shown in FIG. 4. The seal-insert 10 consists of two thin, flat outer rectangular pieces 11 and 12 sandwiching sa inner or middle layer of foam-type two-sided tape 16. As alternatives to the foam-type, other resilient two sided tapes such as cloth or fiberglass could be used in single or multiple layers. But foam-type two-sided tape works best. As an alternative, regular resilient two-sided tape could be used to fix a foam material between the outer pieces. The foam material would be cut to the shape formed by the tape, and would include a slot. The outer pieces 11 and 12 are provided with slots 13. The configuration of the tape is such that a slot 14 is formed with an end-opening 15 for insertion of the slide-seal 17. Slots 13 are shorter and narrower than slot 14 and are not open-ended slots. So when slide-seal 17 is inserted in the open end 15 of slot 14 and slid into position, the slide-seal will more than overlap both slots 13 and create a perfect seal. In this type of hopper without hopper-grooves, the foam type or other resilient material is still appropriate for quick and easy assembly, however, it also may use the resiliency aspect to seal it tightly to avoid leaks.

The size of the slide-seal 17 is limited by the narrowness of the slot 14 in the tape 16. Because the width of the slide-seal will therefore be small, toner can sometimes get through the seal between the edges of the slots 13 and 14. It has been found that if the slide-seal 17 is a magnetized flexible plastic strip, it attracts toner and dams up the edges and ends of the seal formed by the fit between the slide-seal 17 and the slots of the outer rectangular pieces 11 and 12 and the foam-type two-sided tape 16, thereby improving the performance of the seal. A laminate of plastic and flexible magnetic material joined with glue or two-sided tape work well. The plastic is needed to give the slide-seal 17 stiffness desired for insertion. One example of a good stiff plastic is polycarbonate. Flexible magnetic material with thin metal laminate has also been used, however, has been found to be razor sharp, and consequently, the user, when pulling the seal may get a cut, and is considered to be dangerous.

Figure 3:
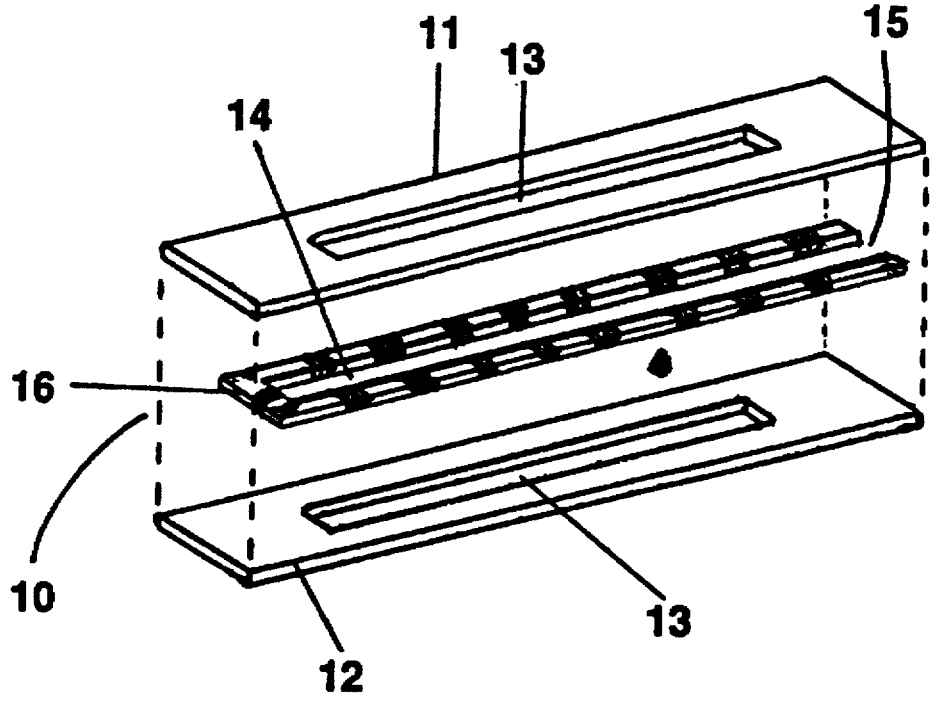
FIG. 3 is an isometric drawing showing the two outer pieces and the inner layer of tape of the seal-insert unit of this invention.
Figure 4:
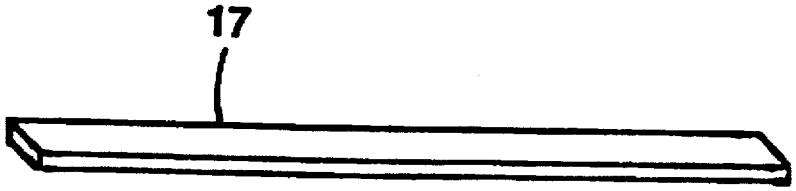
FIG. 4 shows the slide-seal strip that fits into the slot of the seal-insert unit of FIG. 3.
Figure 5:
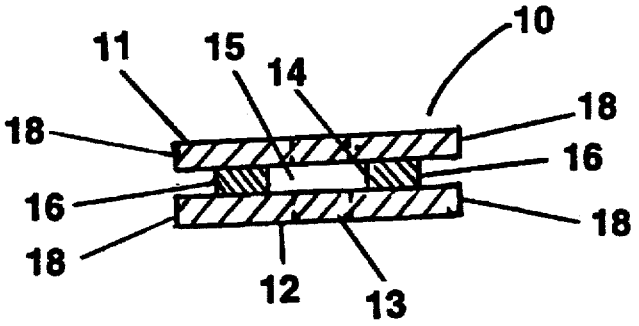
FIG. 5 shows the end view of the seal-insert unit with its slot opening.

The foam-type two-sided tape may be die cut to form a rectangular u-shaped layer with a slot 14 as shown in FIG. 3. Or it may comprise 3 separate pieces of tape, two long and one short, attached separately by one side or face to outer piece 12. Outer piece 11 may then be connected to piece 12 by pressing piece 11 against the other side or face of the tape. The outside perimeter of the tape may also be cut narrower than the outer pieces 11 and 12, as shown in FIG. 5, or may be just up to the edge of outer pieces 11 and 12. FIG. 5 is a view from the right end of FIG. 3. The reason the edges 18 of the outer pieces 11 and 12 may extend (overlap) beyond the tape 16 is for further expansion and compression features, as it slides in the end-hopper groove to fill and therefore seal the end-hopper-groove, which will be discussed a little later. However, as stated, not all hoppers have an end-hopper-groove, so this feature is therefore, only used when necessary.

Figure 6:
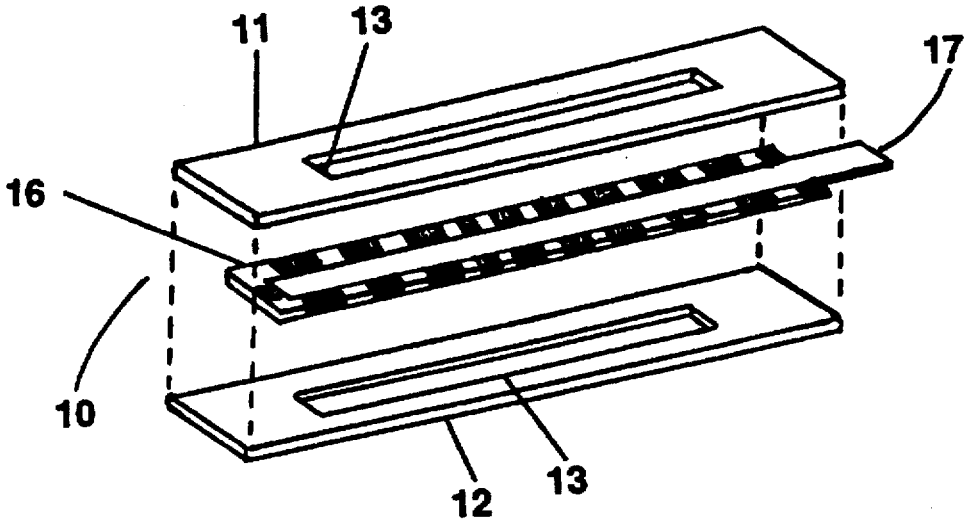
FIG. 6 shows the seal-insert and depicts how the slide-seal strip fits into the slot.

FIG. 6 shows the slide-seal 17 after insertion into the seal-insert 10. This figure is for ease of viewing only. The two pieces 11 and 12 of the seal-insert would already be joined into one component 10 by the tape 16, as shown in FIG. 5. FIGS. 3 and 6 are only meant to show in a readable way the construction of the seal-insert 10 by breaking it down into its two pieces and inner layer of tape with dashed lines depicting where they connect. Note that although the outer rectangular pieces 11 and 12 are shown to be identical in FIG. 3, material thickness and other dimensions may vary from piece 11 to piece 12 to fit the environment of a particular toner hopper. The middle layer of foam-type two-sided tape 16 may also be of differing dimensions, and the slots of the two pieces and tape, though shown to be longitudinal and located along the centerlines of the pieces in the drawings, may not be along the centerlines of the pieces depending on the situation. The outer pieces and inner tape are also much thinner than depicted.

As shown in FIG. 6, the slide-seal 17 is longer than the slot 14 in tape 16 so it may be grasped and operated easily. Another reason for this is discussed below. The seal-insert pieces and the slide-seal may be constructed of plastic material, such as polycarbonate, cardboard or similar material, or of steel material. The two-sided tape 16 may be of a type other than foam, but foam-like two-sided tape has been found to work best for reasons of resiliency, compressibility, and expandability.

Figure 7:
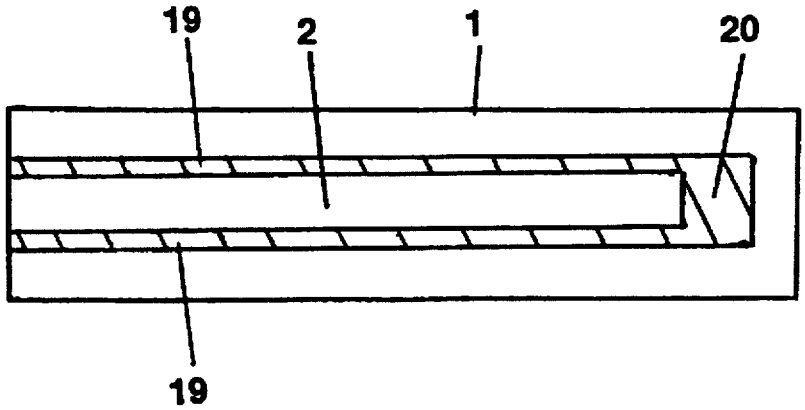
FIG. 7 is a top, cross-section view of the opening and seal attach-area perimeter of the toner hopper.

The seal-insert may be attached over the toner hopper opening by two-sided tape, glue, or other suitable means. It may also be fused to the toner hopper by dissolving chemicals such as methylene chloride, acetone, etc. The opening 2 of the toner hopper 1 shown in FIG. 1 is shown in a top, cross-section view in FIG. 7. At the outer edges of the opening 2 are hopper-grooves 19. The edges 18 of the two outer pieces 11 and 12 of the seal-insert would fit into these hopper grooves 19. There is also a end-hopper-groove 20 at the opposite end of the opening from the bracket 4. The end-hopper-groove 20 receives the end of the seal-insert as it is slid into the hopper. Now, and this is an important part of this invention, the surfaces of the hopper-grooves 19 and end-hopper-groove 20 are not of an even or smooth nature. They are not machined perfectly and sometimes toner or clumps of toner and other debris stick in the grooves and recess. So the surfaces of the groves, recess and the opening at bracket 4 form a series of hips and valleys. All these uneven surfaces will be called the seal attach-area perimeter of opening 2. By attaching the seal-insert 10 to the seal-attach area perimeter of opening 2 by the above mentioned means, the seal-insert 10 may be perfectly and permanently sealed in the toner hopper 1. The seal-insert 10 has a resiliency and flexibility caused by the foam-type two-sided tape 16, the thinness of the outer pieces 11 and 12, and the tape being narrower than the pieces such that the edges 18 of the pieces extend beyond the tape. This resiliency and flexibility allows the seal-insert to mold or conform to the uneven surfaces of the seal-attach-area, improving the seal's prevention of toner leakage. The adhesives attaching the seal-insert to the seal-attach-area also improve the seal, however, in many cases are not necessary, since the hopper-grooves 19 are well sealed by using resilient expanding and contracting material like foam, foam tape, etc.

Another important part of this invention is that some toner hoppers 6, as shown in FIG. 2, have a constriction 8 at the entrance whereby the opening is narrower than the required width of a one-piece seal. This invention solves this problem by creating a permanent seal-insert 10 that stays affixed to the toner hopper 6 with its own slot 14 of a narrow enough width, that a narrow slide-seal 17, can fit both in this slot 14 and through the said constriction 8. This is why the slide-seal 17 is longer than slot 14, as discussed previously. The toner hopper 6 containing both the slide-seal 17 and seal-insert 10 will prevent toner spillage during cartridge shipment, or otherwise.

The seal-insert 10 with the slide-seal 17 thereby provides means for sealing the entire opening 9, and thereby prevent any dry toner from spilling from the toner hopper 6 during cartridge shipment, or, otherwise.

Figure 8:
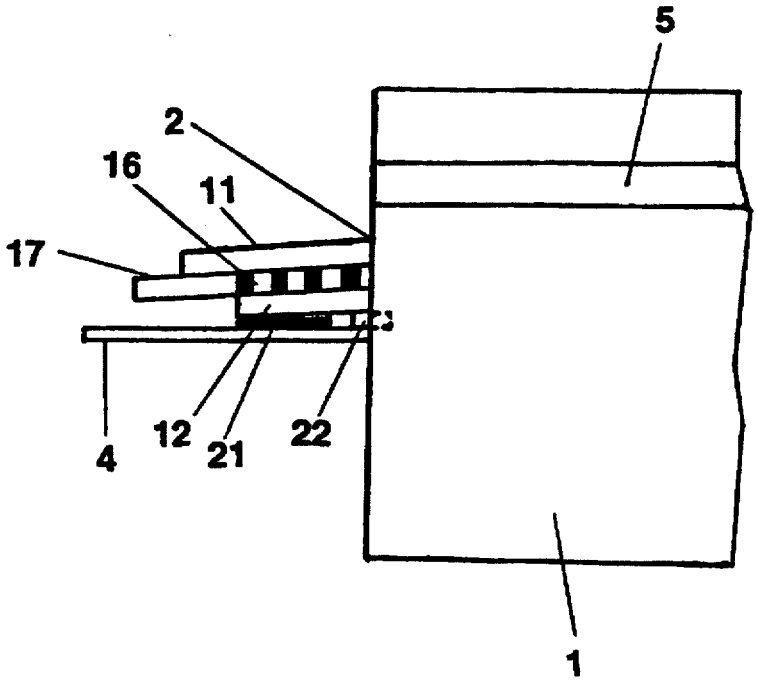
FIG. 8 is an illustration showing the end of the seal-insert and slide-seal adjacent the bracket of the toner hopper.

Some slight modifications may be made to improve the performance of the seal. FIG. 8 is an illustration showing the end of the seal-insert 10 adjacent to bracket 4 of the toner hopper 1. A two-sided piece of tape 21 is attached to the underside of the seal-insert 10. The tape 21 adheres the seal-insert to the bracket 4, further anchoring the seal-insert 10 in the toner hopper 1. It also prevents inadvertent sliding of the slide-seal 17 under the seal-insert 10 instead of into the slot 14. A piece of foam 22 (or a strip of plastic) or foam tape is glued or otherwise adhered to the underside of the seal-insert 10 adjacent to the tape 21. The foam 22 applies an upward pressure on the flexible seal-insert, forcing it against the top of the opening 2 at the bracket 4 end, further improving the seal at that end. The piece of foam 22 (or a strip of plastic) could also be placed on the topside of outer piece 11 to improve the seal at the bottom of opening 2.

Hot melt glue or other glue may also be used along the end of the seal-insert 10, sealing it with respect to the toner hopper 1, to improve the sealing ability, of course leaving open the opening where the slide-seal goes. This may be used in conjunction with the embodiments of the previous paragraph or may be used instead of the embodiments of the previous paragraph.

It was mentioned previously that dimensions of the pieces 11 and 12 of the seal-insert 10 may vary. Note that in FIG. 8, outer top piece 11 is longer than the outer lower piece 12 and thus sticks out further from the opening 2. Outer top piece 11 may therefore act as a guide, making it easier to place the slide-seal 17 into its position in the seal-insert 10. The slide-seal 17 slides under the piece 11 before sliding into the slot formed by the tape 16.

Figure 9:
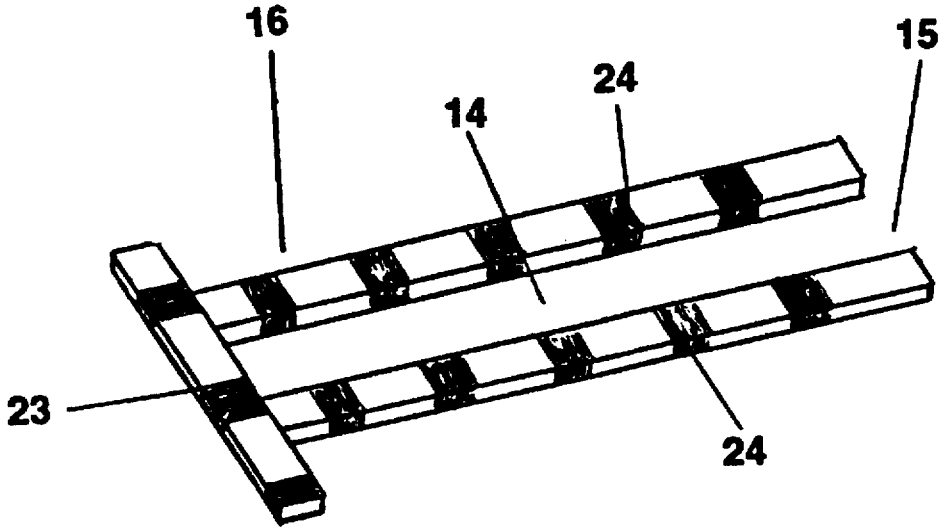
FIG. 9 shows a modified version of the tape layer of the seal-insert.

FIG. 9 shows a modified version of the foam-type two sided tape 16. At the end opposite the open end 15 of the slot 14 formed by the tape, the cross-piece 23 extends beyond the legs 24 to what will be the outer edges 18 of the outer pieces 11 and 12 when the seal-insert 10 is assembled. It has been found that this extension improves the seal at the end of the toner hopper in hoppers with hopper-grooves at the end hopper-groove, opposite the opening where the slide-seal 17 is slid into the seal-insert. The extended cross-piece 23 puts more expansion force against the outer pieces at the seal-attach-area perimeter opposite the opening 2. By having this extension only at the closed end of the tape 16, the seal-insert may still be easily slid in position in the toner hopper through the longitudinal hopper-grooves.

Figure 10:
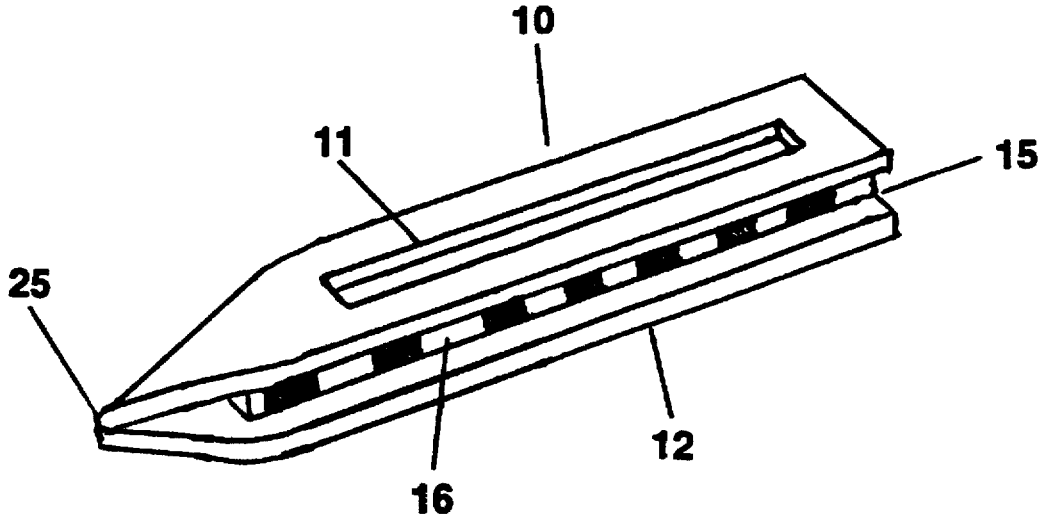
FIG. 10 shows a seal-insert with fused together ends and shaped for ease of installment.

It is sometimes difficult to get the end of the seal-insert 10 into the seal-attach-area perimeter of opening 2 and the end-hopper groove 20. As shown in FIG. 10, the outer pieces 11 and 12 of the seal-insert may be joined together at the end opposite the slot opening 15. The joined together pieces are bonded to each other by glue, caulk, or a dissolving chemical like methylene chloride, etc. The ends are then cut in a shape extending to a point 25, making the seal-insert 10 easier to slide into position through the hopper grooves 19 on into the end-hopper-groove 20.

Figure 11:
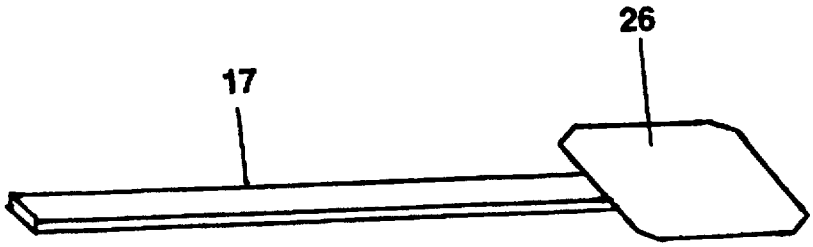
FIG. 11 shows the slide-seal strip with a handle.

The slide-seal 17 may also be provided with a flat plastic handle 26, as shown in FIG. 11, for ease of placing the slide-seal 17 in the seal-insert 10 or removing it from the seal-insert. The handle may be bonded to the slide-seal with a solvent, or attached by some other means. The name of the seal, customer names and addresses, phone number, or other information could be printed on the handle, as well as directions such as "PULL" or PULL HERE".

Figure 12:
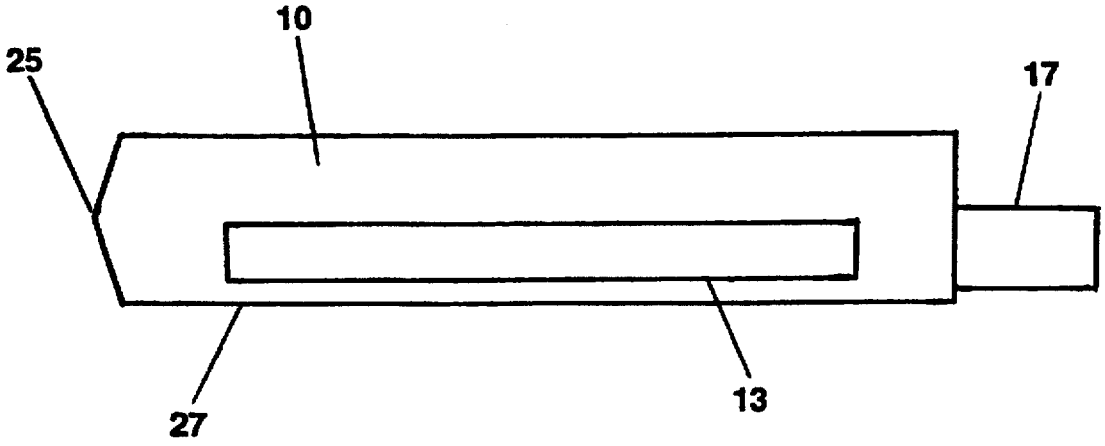
FIG. 12 shows the seal-insert with the slots in a different position.

In operation, the toner hopper 1 is not upright as shown in FIG. 1 and 8. It has a sideways orientation such that there is a horizontal flow of toner from the hopper through the seal-insert 10. If the slots 13 of the outer pieces 11 and 12 and the slot 14 of the tape 16 of the seal-insert 10 were located in the center of the seal-insert, toner could be blocked by the lower portion of the seal-insert. Since the toner level in the hopper falls by gravity, there would be toner left in the hopper if the slots were in the middle of the seal-insert 10. To overcome this problem, FIG. 12 shows an embodiment of the invention wherein the slots 13 of the outer pieces of the seal-insert 10 (and the slot 14 of the tape 16, not shown) are located closer to one edge 27 of the seal-insert 10. In other words, when the toner hopper, seal-insert 10 and slide-seal 17 are in their operating positions, the slot 13 would be located at the lower edge of the seal-insert 10, preventing a build-up of toner below the slot 13.

Figure 13:
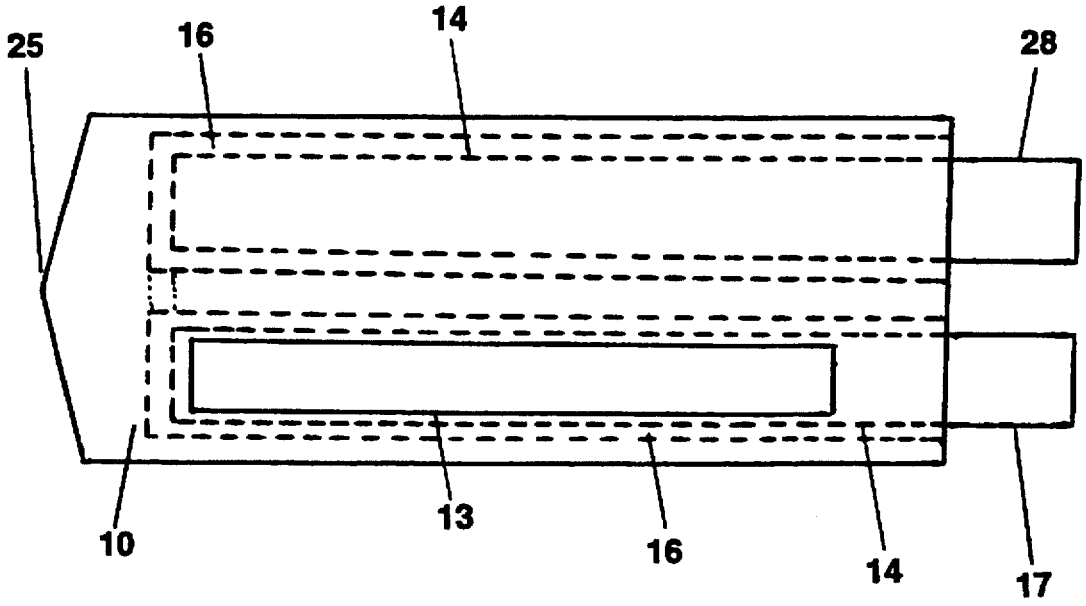
FIG. 13 shows a seal-insert with an increased width and a tool for keeping the seal-insert rigid.

In some toner cartridges, such as the Hewlett Packard Laser Jet 4, the toner hopper 1 is wider and hence the opening 2 is wider. The embodiment of this invention shown in FIG. 13 is useful for these types of cartridges. Hewlett Packard simply uses a cellophane like seal which is pulled out to put the hopper into operation but cannot be put back in. Using applicant's device, the hopper may be resealed. It is advantageous to keep toner passage formed by the slots 13 in the seal-insert 10 as narrow as possible so there is less spill and mess. But the seal-insert 10 has to be approximately doubled in width to fit with the toner hopper and opening. So the seal-insert 10 is increased in width but only one side of the seal-insert is provided with the slots 13 for the slide-seal 17. The other side of the seal-insert 10 also contains an inner piece of foam-type two-sided tape 16 with slide-slot 14 and end-opening 15. But no corresponding slots 13 are provided in the outer pieces 11 and 12 adjacent the slide-slot 14. A flat plastic tool 28 or strip is furnished for sliding into the slide-slot 14. The tool 28, like the slide-seal 17, keeps the seal-insert 10 rigid so it is easier to place the seal-insert 10 into the toner hopper. Unlike the slide-seal 17, the tool 28 does not block toner passage through open slots, since there are no open slots 13 provided in the outer pieces 11 and 12 on the tool side of the seal-insert 10. After the seal-insert 10 is installed into the toner hopper, the tool 28 is removed. The slide-seal 17 is not removed from the seal-insert 10 until after the hopper (which may be in a toner cartridge) is shipped to the user's location and is ready to be placed in a dry toner machine.

Figure 14:
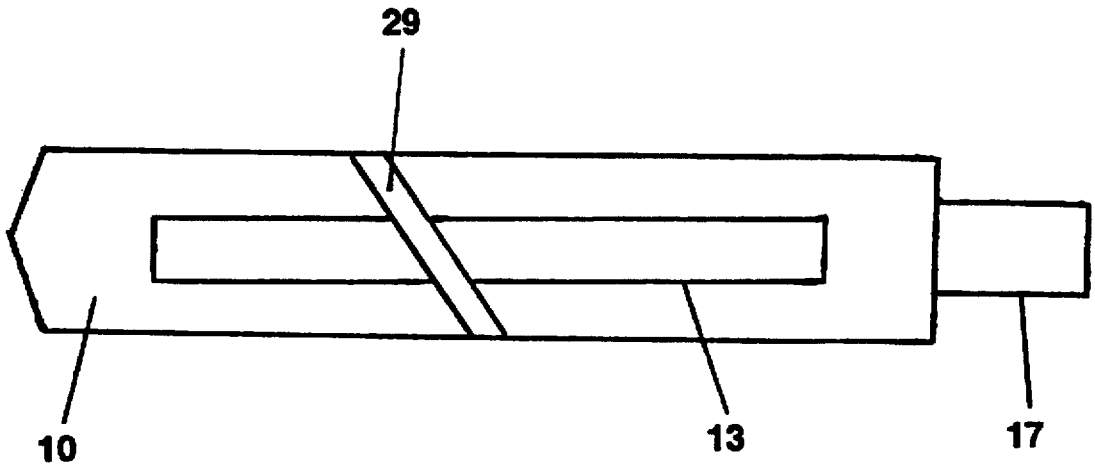
FIG. 14 shows a seal-insert with a device for fixing the width of the slot.
Figure 16:
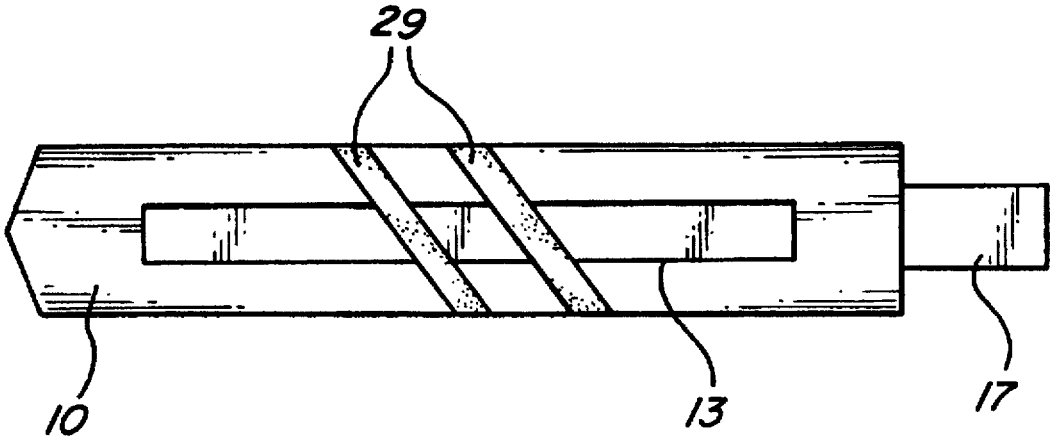
*FIG. 16 shows a seal-insert with multiple devices for fixing the width of the slot.*

Because the seal-insert 10 is long and flexible, the width of the slots 13 can change in some cases, spreading and causing leaks around the slide-seal 17 or pinching and preventing the desired flow of toner when the slide-seal 17 is removed. FIG. 14 shows an attempt to solve this problem *by utilizing a brace, or installation support means, to maintain the width of the slot 13. The brace can also be referred to as a reinforcing member, a splint, or a stabilizer. The brace comprises a* [A] small piece of material 29 *which* is attached across the width of an outer piece of the seal-insert 10. The material 29 sets the proper width of the slot 13 and prevents the slot 13 from spreading or pinching. There could be one or more of these cross pieces *as shown in FIG. 16*. The material 29 could be a piece of two-sided tape or a small piece of plastic chemically bonded, taped, or glued to an outer piece of the seal-insert 10.

Figure 15:
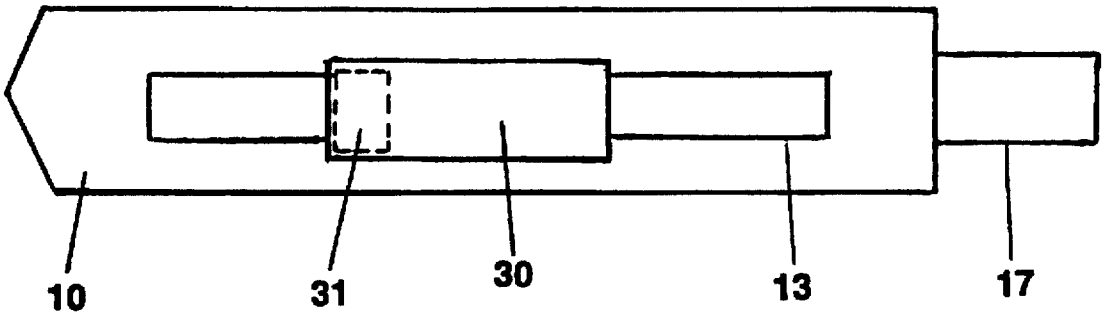
FIG. 15 shows a seal-insert with another type of device for fixing the width of the slot.

In FIG. 15, the cross-piece is shown as a rectangular slot-setter tab 30 with two-sided tape 31 on one end. The cross-piece is used as a slot setter. It keeps the slot 13 from spreading or pinching while the seal-insert 10 is being fixed on the toner hopper 6. The slot-setter 30 is then removed by pulling on the un-taped end of the slot-setter 30. The slot setter 30 may be used with the seal-insert 10 of this invention or with other types of slotted seals used in toner cartridge assemblies, such as those disclosed in the background of this invention. It can be made out of plastic, metal, cardboard, etc. The rectangular shape is not important. It can be made in other variations, so long as it sets the slot 13 and is removable after installation of the seal-insert 10 or other variation of a slotted installable piece.

Accordingly, a very unique, convenient method and system is provided for re-filling, and re-sealing, the toner hopper for shipping, and re using it, rather than having to purchase a new, expensive toner cartridge each time the toner hopper is empty.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A sealing means for sealing a toner hopper used in printer, copying machine or facsimile machine toner cartridges, in order that used toner cartridges can be refilled with toner, sealed, and transported with little possibility of spilling any of the toner from the toner hopper, said toner hopper having an opening through which toner flows, said sealing means comprising a seal-insert and slide-seal, wherein said seal-insert comprises outer pieces fastened into one component by a layer of resilient two-sided foam-type tape such that said outer pieces sandwich said tape between them, said outer pieces having corresponding slots and said tape having a slot wider than said slots in said outer pieces and being open at one end, said slots in said outer pieces and said slot in said tape being aligned such that a passage is formed through said seal-insert, said slide-seal comprising a strip of material that may be slid through the open end of said slot in said tape, blocking said passage in said seal-insert, so that when said seal-insert is attached to the toner hopper over said toner hopper opening, said slide-seal would provide a reusable seal blocking or allowing toner flow through said toner hopper opening and through said seal-insert passage.

2. The sealing means of claim 1 wherein said outer pieces of said seal-insert are made of plastic material.

3. The sealing means of claim 1 wherein said outer pieces of said seal-insert are made of cardboard.

4. The sealing means of claim 1 wherein said outer pieces of said seal-insert are made of steel material.

5. A sealing means as in claim 1 wherein said slide-seal is made of plastic material.

6. The sealing means of claim 5 wherein said plastic is polycarbonate material.

7. The sealing means of claim 1 wherein said slide-seal is made of steel material.

8. A sealing means as in claim 1 wherein there are two of said outer pieces of said seal-insert.

9. A sealing means as in claim 8 wherein said two outer pieces of said seal-insert are rectangular and said slots are longitudinally located on said pieces.

10. A sealing means as in claim 9 wherein said outer pieces each have a length and a centerline extending along said length, and said slots of said outer pieces extend along the centerlines of said pieces.

11. A sealing means as in claim 1 wherein said toner hopper has a constriction at one end, said constriction being narrower than said opening in said toner hopper, and wherein said slide-seal and said slots in said seal-insert pieces and said slot in said tape are sized such that said slide-seal is narrow enough to slide through said constriction but wide enough to block said passage formed by said slots in said seal-insert pieces.

12. The sealing means of claim 1 wherein the layer of resilient two-sided foam-type tape is die cut to form a rectangular u-shaped layer.

13. The sealing means of claim 1 wherein the layer of resilient two-sided foam-type tape is comprised of three separate lengths of tape including a cross-piece and two legs longer than said cross-piece, said tape layer having two ends, [whereby] *wherein* the cross-piece is at the end of the tape layer opposite the end of the tape layer with the open end of said slot in said tape.

14. The sealing means of claim 13 wherein said outer pieces each have outside edges along their longitudinal lengths, said cross-piece extending to said outside edges when said layer of resilient two sided foam-type tape is sandwiched between said outer pieces.

15. The sealing means of claim 1 wherein the layer of tape and the outer pieces each have perimeter lengths and widths, and the perimeter length and width of said layer of resilient two-sided foam-type tape are smaller than the perimeter length and width of said outer pieces whereby the outer pieces overlap said resilient two-sided foam-type tape layer.

16. The sealing means of claim 1 wherein said outer pieces of said seal-insert have ends opposite the open end of said slot in said layer of tape, said outer piece ends being bent and bonded together.

17. The seating means of claim 16 wherein said bent and bonded together ends of said outer pieces are cut to a shape extending to a point.

18. The sealing means of claim 16 wherein said bent and bonded together ends of said outer pieces are fused together by a dissolving chemical.

19. The sealing means of claim 1 wherein said seal-insert has an end containing said open end of said slot in said tape, said seal-insert end having an underside, said underside having a piece of two-sided tape stuck to it, [whereby] *wherein* said underside of said seal-insert end may be attached to said toner hopper.

20. The sealing means of claim 19 wherein said underside of said seal-insert end has a piece of foam adhered to it adjacent said two-sided piece of tape, [whereby] *wherein* said piece of foam may press said seal-insert against said opening of said toner hopper at said seal-insert end, improving said seal.

21. The sealing means of claim 20 wherein one of said outer pieces is longer than the other of said outer pieces, such that the longer outer piece extends over said open end of said slot in said tape and acts as a guide for ease of placement of said slide-seal into position in said seal-insert.

22. The sealing means of claim 1 wherein one of said outer pieces is longer than the other of said outer pieces, such that the longer outer piece extends over said open end of said slot in said tape and acts as a guide for ease of placement of said slide-seal into position in said seal-insert.

23. The sealing means of claim 1 wherein said slide-seal is a magnetized strip[, whereby it] *which* attracts toner.

24. The sealing means of claim 23 wherein said magnetized strip is made of flexible plastic.

25. The sealing means of claim 24 wherein said slide-seal has a handle at one end.

26. The sealing means of claim 1 wherein said slide-seal has a handle at one end.

27. The sealing means of claim 26 wherein said handle is plastic and flat.

28. The sealing means of claim 27 wherein said handle is bonded to said slide-seal with a solvent.

29. The sealing means of claim 1 wherein said seal-insert has two edges which extend along said slots in said outer pieces and said tape, [whereby] *wherein* said slots are located closer to one of said edges than to the other.

30. A sealing means for sealing a toner hopper used in printing, copying or facsimile machine toner cartridges, in order that used toner cartridges can be refilled with toner, sealed, and transported with little possibility of spilling any of the toner from the toner hopper, said toner hopper having an opening through which toner flows, said sealing means comprising a seal-insert and slide-seal, wherein said seal-insert comprises outer pieces fastened into one component by a *first* layer of resilient two-sided tape such that said outer pieces sandwich said *first layer of* tape between them, said outer pieces having corresponding slots and said *first layer of* tape having a slot wider than said slots in said outer pieces and being open at one end, said slots in said outer pieces and said slot in said *first layer of* tape being aligned such that a passage is formed through said seal-insert, said slide-seal comprising a strip of material that may be slid through the open end of said slot in said *first layer of* tape, blocking said passage in said seal-insert, so that when said seal-insert is attached to the toner hopper over said toner hopper opening, said slide-seal would provide a reusable seal blocking or allowing toner flow through said toner hopper opening and through said seal-insert passage, and said outer pieces have increased width so said sealing means can be used in a toner hopper having a wider opening, said increased width of said outer pieces being without slots but also including a *second* sandwiched layer of resilient two-sided tape forming an open-ended inner slot.

31. The sealing means of claim 30 wherein said increased width of said outer pieces includes a removable tool for insertion into said open ended inner slot, [whereby] *wherein* said tool keeps said seal-insert rigid for easier attachment of said seal-insert to said toner hopper over said wider opening.

32. The sealing means of claim 31 wherein said tool is a flat strip of plastic.

33. The sealing means of claim 1 wherein said slots of said outer pieces have a width, and a small piece of material is attached to one of said outer pieces across the width of the slot in said one of said outer pieces, [whereby] *wherein* the width of the slot in said one of said outer pieces is fixed and cannot spread or pinch.

34. The sealing means of claim 33 wherein said small piece of material is a rectangular piece of plastic with two-sided tape on one end, [whereby] *wherein* said piece of material may be easily removed from said one of said outer pieces after said seal-insert is attached to said toner hopper and said slot width is fixed.

35. The sealing means of claim 30 wherein said *first layer of* resilient two-sided tape fixes a foam material between said outer pieces.

36. The sealing means of claim 30 wherein said *first and said second layers of* resilient two sided tape [comprises] *comprise* layers of cloth type two sided tape.

37. The sealing means of claim 30 wherein said *first and said second layers of* resilient two-sided tape [comprises a layer of] *comprise* fiberglass-type two-sided tape.

38. A slot width setting means for use with a seal-insert and sealing means for sealing a toner hopper used in printing, copying and facsimile machines, said seal-insert comprising a slotted member, said slot width setting means comprising a small piece of plastic with two-sided tape on one end, [whereby] *wherein* said small piece of plastic is applied to said seal-insert over the slot while said seal-insert is attached to said toner hopper.

*39. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a brace joined to said sealing assembly;*

*and said brace extending across said longitudinal slot.*

*40. The device set forth in claim 39 wherein said brace is disposed perpendicular to said longitudinal slot.*

*41. The device set forth in claim 39 wherein said brace is disposed non-perpendicular to said longitudinal slot.*

*42. The device set forth in claim 39 wherein said brace is rigid.*

*43. The device set forth in claim 39 wherein said sealing assembly includes a back surface; and*

*said brace is disposed on said back surface of said sealing assembly.*

*44. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a brace removably adhered to said back surface of said sealing assembly.*

*45. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a cardboard brace removably adhered to said back surface of said sealing assembly.*

*46. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a metal brace removably adhered to said back surface of said sealing assembly.*

*47. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a plastic brace removably adhered to said back surface of said sealing assembly.*

*48. An improved device for sealing a toner passage in a toner hopper of a type used in printer, copying machine, or facsimile machine toner cartridges, said device comprising:*

*a sealing assembly comprising an elongated strip including first and second longitudinal side members;*

*said longitudinal side members defining a longitudinal slot in said elongated strip between said first and second longitudinal side members;*

*said longitudinal slot including a width; and*

*a brace joined to said first and said second longitudinal side members and dividing said longitudinal slot into first and second slot sections.*

*49. An improved device for sealing a toner passage in a toner hopper of a type used in printer, copying machine, or facsimile machine toner cartridges, said device comprising:*

*a sealing assembly comprising an elongated strip including a front surface to be later joined to the toner hopper and a back surface;*

*a brace comprising an elongated member disposed lengthwise along said elongated strip, said brace joined to said back surface of said elongated strip.*

*50. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a brace permanently joined to said back surface of said sealing assembly.*

*51. An improved device for sealing a toner passage in a toner hopper of a type used in printer, copying machine, or facsimile machine toner cartridges, said device comprising:*

*a sealing assembly;*

*said sealing assembly including a front surface to be later joined to the toner hopper and a back surface;*

*a brace removably joined to said back surface of said sealing assembly.*

*52. An improved device for sealing a toner passage in a toner hopper of a type used in printer, copying machine, or facsimile machine toner cartridges, said device comprising:*

*a sealing assembly including a front surface and a back surface;*

*a cardboard brace removably adhered to said back surface of said sealing assembly;*

*said brace comprising support means which supports said device while said device is being positioned after which said brace is removed to leave said device in place; and*

*two-sided tape attached to said front surface of said sealing assembly for allowing said sealing assembly to be positioned adhesively on the toner hopper.*

*53. An improved device for sealing a toner passage in a toner hopper of a type used in printer, copying machine, or facsimile machine toner cartridges, said device comprising:*

*a sealing assembly including a front surface and a back surface;*

*a cardboard brace removably adhered to said back surface of said sealing assembly;*

*said brace comprising support means which supports said device while said device is being positioned after which said brace is removed to leave said device in place; and*

*glue attached to said front surface of said sealing assembly for allowing said sealing assembly to be positioned adhesively on the toner hopper.*

*54. The sealing assembly as set forth in either of claims 39 or 49 wherein said brace comprises a plurality of cross-pieces.*

*55. The device set forth in either of claims 39, 48, or 49 wherein said brace is permanently attached to said sealing assembly.*

*56. The device set forth in either of claims 44, 45, 46, 47, 49, 50 or 51 wherein*

*said sealing assembly including glue on said front surface for allowing said sealing assembly to be positioned adhesively on the toner hopper.*

*57. The device set forth in either of claims 44, 45, 46, 47, 49, 50, or 51 wherein*

*said sealing assembly includes two-sided tape on said front surface for allowing said sealing assembly to be positioned adhesively on the toner hopper.*

*58. The device set forth in either of claims 44, 45, 46, 51, or 53 wherein said brace includes a front surface;*

*said brace is adhered to said back surface of said sealing assembly with glue.*

*59. The device set forth in either of claims 44, 45, 46 51, or 53 wherein said brace includes a front surface;*

*said brace includes two-sided tape on said front surface of said brace; and*

*said brace is adhered to said back surface of said sealing assembly with said two-sided tape.*

*60. The device set forth in either of claims 44, 45, 46, 47, 48, 49, 50, or 51 wherein said back comprises support means which supports said device while it is being positioned after which said brace is removed to leave the device in place.*

*61. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a rigid brace removably adhered to said back side of said sealing assembly.*

*62. An improved device for sealing a toner passage in a toner hopper of a type used in printer, copying machine, or facsimile machine toner cartridges, said device comprising:*

*a sealing assembly linked on two opposite faces to a first glue layer, said first glue layer being intended to contact the toner hopper and being suitable to place correctly said sealing assembly on the toner hopper while a second glue layer linked to a substantially rigid brace exerts a gluing force between said brace and said sealing assembly so that after placing said sealing assembly upon the toner hopper, said brace can be removed without damaging said sealing assembly.*

*63. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a support joined to said sealing assembly;*

*and said support extending across said longitudinal slot.*

*64. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a support removably adhered to said back side of said sealing assembly.*

*65. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a cardboard support joined to said sealing assembly;*

*and said cardboard support extending across said longitudinal slot.*

*66. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a cardboard support removably adhered to said back side of said sealing assembly.*

*67. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and second longitudinal side members;*

*a reinforcing member joined to said sealing assembly;*

*and said reinforcing member extending across said longitudinal slot.*

*68. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a reinforcing member removably adhered to said back side of said sealing assembly.*

*69. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a setting device joined to said sealing assembly;*

*and said setting device extending across said longitudinal slot.*

*70. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a setting device removably adhered to said back side of said sealing assembly.*

*71. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*an installation support joined to said sealing assembly;*

*and said installation support extending across said longitudinal slot.*

*72. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*an installation support removably adhered to said back side of said sealing assembly.*

*73. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a splint joined to said sealing assembly;*

*and said splint extending across said longitudinal slot.*

*74. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a splint removably adhered to said back side of said sealing assembly.*

*75. An improved device for sealing a toner passage in a toner hopper of a type used in printer, copying machine, or facsimile machine toner cartridges, said device comprising:*

*a sealing assembly;*

*said sealing assembly comprising an elongated strip;*

*said sealing assembly including first and second longitudinal side members defining a longitudinal slot in said elongated strip between said first and said second longitudinal side members;*

*a stabilizer joined to said sealing assembly;*

*and said stabilizer extending across said longitudinal slot.*

*76. An improved device for sealing a toner passage in a toner hopper of a type used in printer, copying machine, or facsimile machine toner cartridge, said device comprising:*

*a sealing assembly;*

*said sealing assembly including a front side to be later joined to the toner hopper and a back side;*

*a stabilizer removably adhered to said back side of said sealing assembly.*

*77. An improved device for sealing a toner passage in a toner hopper of a type used in printer, copying machine, or facsimile machine toner cartridge, said device comprising:*

*a sealing assembly; and*

*a brace removably adhered to said sealing assembly;*

*said brace including a front surface;*

*said front surface of said brace including a first region with adhesive thereon;*

*said front surface of said brace including a second region with no adhesive thereon wherein the second region with no adhesive makes it easier to remove the brace from said sealing assembly.*

*78. The device set forth in either claims 39 or 48, wherein said sealing assembly includes a front surface; and*

*said sealing assembly including glue on said front surface for allowing said sealing assembly to be positioned adhesively on the toner hopper.*

*79. The device set forth in either of claims 39 or 48 wherein said sealing assembly includes a front surface; and*

*said sealing assembly including two-sided tape on said front surface for allowing said sealing assembly to be positioned adhesively on the toner hopper.*

*80. The device set forth in claim 48 wherein said sealing assembly includes a back surface and said brace includes a front surface;*

*said brace is adhered to said back surface of said sealing assembly with glue.*

*81. The device set forth in claim 48, wherein said sealing assembly includes a back surface and said brace includes a front surface;*

*said brace includes two-sided tape on said front surface; and*

*said brace is adhered to said back surface of said sealing assembly with said two-sided tape.*

* * * * *